United States Patent [19]
Gostin

[11] 3,968,490
[45] July 6, 1976

[54] RADAR MTI PROCESSOR WITH CFAR

[75] Inventor: Judson J. Gostin, Manlius, N.Y.

[73] Assignee: General Electric Company, Syracuse, N.Y.

[22] Filed: May 3, 1974

[21] Appl. No.: 466,730

[52] U.S. Cl.............................. 343/7.7; 343/17.2 PC
[51] Int. Cl.² ........................ G01S 7/30; G01S 9/42
[58] Field of Search................... 343/7.7, 17.2 PC

[56] References Cited
UNITED STATES PATENTS

| | | | |
|---|---|---|---|
| 3,105,967 | 10/1963 | Cook et al. | 343/17.2 PC |
| 3,150,368 | 9/1964 | Price | 343/17.2 PC |
| 3,157,875 | 11/1964 | Matsukasa et al. | 343/7.7 |
| 3,374,479 | 3/1968 | Moore | 343/7 A |
| 3,441,931 | 4/1969 | Shrader | 343/7.7 |
| 3,465,336 | 9/1969 | Fishbein et al. | 343/7.7 |
| 3,701,149 | 10/1972 | Patton et al. | 343/7 A |
| 3,829,858 | 8/1974 | Bergkvist | 343/7 A |

*Primary Examiner*—Malcolm F. Hubler
*Attorney, Agent, or Firm*—Carl W. Baker; Joseph B. Forman; Frank L. Neuhauser

[57] ABSTRACT

Disclosed is a radar signal processor providing Moving Target Indicator (MTI) operation with Constant False Alarm Ratio (CFAR) capability. The processor affords substantially reduced incidence of false alarms due to large clutter scatterer returns which exceed normal detection thresholds even after suppression by conventional MTI processing, and at the same time it affords largely unimpaired subclutter visibility. These capabilities are achieved by paralleling the MTI channel with a second processor channel which provides CFAR operation by imposing an additional detection threshold effective to blank the response of the MTI channel to very large clutter scatterers.

3 Claims, 5 Drawing Figures

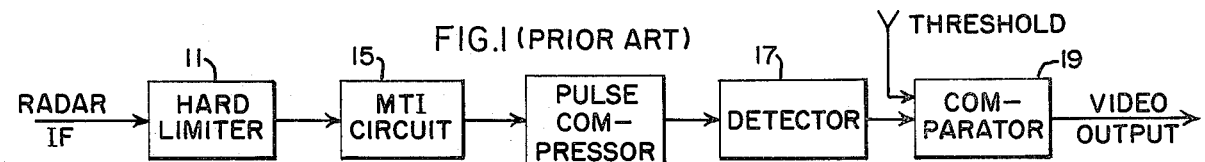
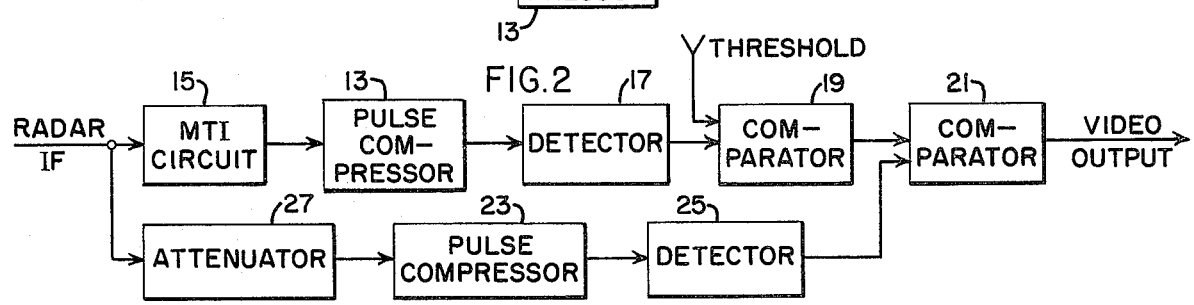
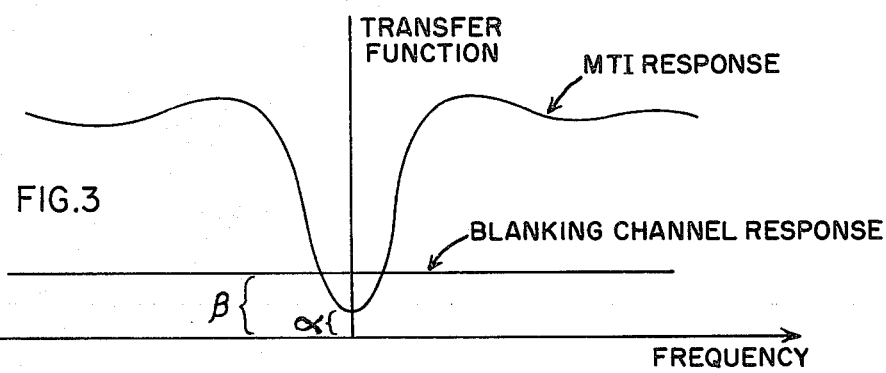
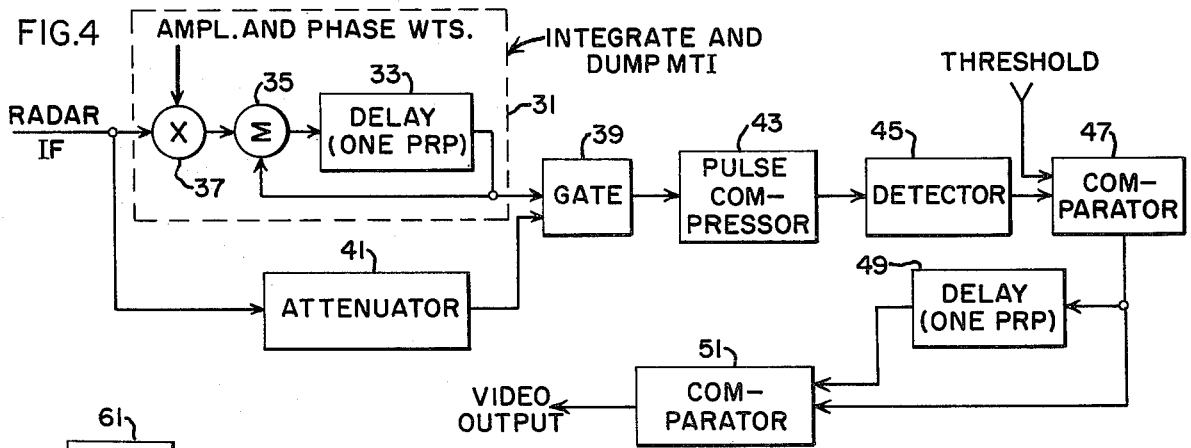
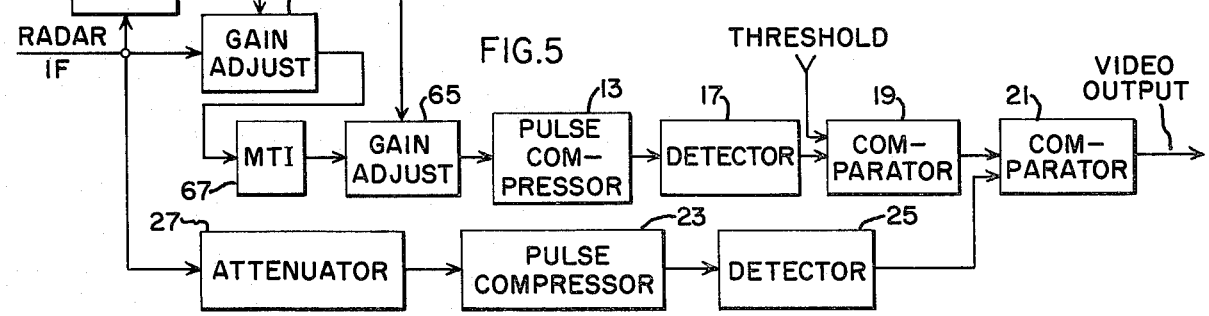

RADAR MTI PROCESSOR WITH CFAR

BACKGROUND OF THE INVENTION

This invention relates to signal processors for pulse doppler radars, and more specifically to such processors providing Moving Target Indicator (MTI) operation and Constant False Alarm Ratio (CFAR) capability.

One of the common problems with conventional moving target indicator (MTI) processing is its inability to completely eliminate false alarms. This problem has drawn increased attention of late because of the disabling effects which excessive false alarms can have an automatic detection and tracking systems. Even well designed, coherent MTIs, capable of providing 40dB or more of signal-to-clutter ratio improvement, suffer in this regard. The problem is due, in major part, to very large clutter scatterers such as water towers, cliff faces and the like. Even after suppression by MTI processing, echoes from such scatterers often are strong enough to exceed detection thresholds.

Approaches to solution of this problem commonly have involved some form of automatic gain control (AGC) or normalization which attenuates very strong input signals to a level such that the MTI suppression will suffice to prevent false alarms. Probably the most extreme example of such prior approaches is the "hard limited" MTI processor, in which the processor chain comprises a hard limiter followed by MTI and pulse compression.

The hard limiter output contains only phase information and is independent of the level of its input. Hence, low-doppler returns of all amplitudes will be suppressed by the MTI to a well defined level below a detection threshold. In-the-clear target returns, on the other hand, will not be suppressed by the MTI, and will be detected after integration via pulse compression.

Thus, the hard limited MTI does provide the desired CFAR capability as well as an "in-the-clear" target detection capability. Unfortunately, it does not also provide a capability to detect targets immersed in clutter. Such target returns are suppressed, at the hard limiter output, according to the clutter-to-signal ratio at its input, and the pulse compression integration will be inadequate for reliable detectability.

The hard limited MTI accordingly provides CFAR and intra-clutter visibility, but fails to provide adequate subclutter visibility. In very patchy or spiky clutter, intra-clutter visibility will permit automatic target tracking even though returns are occasionally lost in the clutter. However, in heavier, more homogeneous clutter situations, subclutter visibility, which is attainable only by linearly processing the signal-plus-clutter return, is required.

Another known approach, which achieves CFAR operation without the attendant loss of subclutter visibility, involves an AGC function incorporated prior to the MTI. The attenuation as a function of range must, of course, be periodic so as not to destroy the cancellation. This approach, however, suffers from a serious shortcoming (beyond the practical difficulties associated with generating a periodic attenuation function) when employed with coded pulses, especially those with high time-bandwidth products.

The AGC circuit precedes the MTI which, in turn, precedes the pulse compression network in order to limit the required dynamic range of the latter. Hence, the attenuation which accompanies the return from a large clutter scatterer lasts for at least the uncompressed signal pulse width. This means that any signals of interest, separated from the strong clutter scatterer by something less than the range extent of the uncompressed pulse, will be quieted by the presence of the clutter. This phenomenon can seriously degrade the detection capability of the radar.

BRIEF SUMMARY OF THE INVENTION

In accordance with the present invention, CFAR operation of an MTI processor is attained even in the presence of very large clutter returns, and this CFAR capability is achieved while preserving a useful degree of subclutter visibility. Briefly, such operation is accomplished by paralleling an MTI processor chain, which may otherwise be conventional in arrangement, with a second "blanking" channel which provides the CFAR capability. The first or primary processor channel includes an MTI cancellation circuit, pulse compressor, detector and threshold comparator; the blanking channel contains an attenuator or other gain control means, a pulse compressor and a detector, the latter two elements being similar to the corresponding elements in the primary channel and the attenuator being included for control of relative signal levels in the two channels. The output of the detector in the blanking channel provides a second detection threshold for the output of the primary channel, permitting target signal output therefrom only when the primary channel signal exceeds both a fixed detection threshold and the threshold provided by the blanking channel output. The addition of this second threshold effectively raises the output threshold transiently when strong fixed target returns are being processed, thus reducing false alarms which might otherwise be caused thereby. In preferred implementations of the invention the pulse compression network may be time-shared between the primary and blanking channels, by operating the MTI in an "integrate-and-dump" mode, and for better linearity in the presence of very high level signals complementary AGC adjustments may be added to the MTI processor input and output.

BRIEF DESCRIPTION OF THE DRAWINGS

These and other features and advantages of the invention will be more readily apparent from the following detailed description when read in conjunction with the accompanying drawings, in which:

FIG. 1 is a block diagram of a conventional MTI processor;

FIG. 2 is a block diagram of an MTI processor in accordance with the invention;

FIG. 3 illustrates the frequency response of the two channels in the MTI processor of FIG. 2;

FIG. 4 is a block diagram of an alternative embodiment of the invention incorporating an integrate-and-dump MTI; and FIG. 5 is a block diagram of another form of the invention including AGC across the MTI circuit.

DESCRIPTION OF PREFERRED EMBODIMENTS

With continued reference to the drawings, FIG. 1 illustrates a conventional MTI processor of the kind incorporating a hard limiter 11 at its input, with pulse compression as at 13 following the MTI cancellation circuit 15. The pulse compressor is followed by a detector 17 the video from which is compared against a fixed threshold as at 19, and passed only if it exceeds that threshold. The operation of the hard limiter 11 is to discard amplitude information and output only the phase information, so that low doppler returns even of large amplitude will be suppressed in the MTI circuit 15 which follows the limiter, to a well defined level below the detection threshold introduced at 19. In-the-clear target returns, on the other hand, will not be suppressed by the MTI, and will be detected, after integration through pulse compression as at 13, to thus yield a video output signal indicating the target presence.

The thresholding function introduced by comparator 19, together with hard limiting at 11 of the input to the MTI cancellation circuit 15, provides the desired CFAR capability while maintaining in-the-clear target detection capability as also desired. Unfortunately, it does not as well provide the capability to detect targets immersed in clutter, since such target returns are suppressed by the hard limiter according to the clutter-to-signal ratio at its input, and the pulse compression integration at 13 will be inadequate for reliable detectability. Subclutter visibility is thus severely impaired if not wholly absent in this known system.

To achieve subclutter visibility while maintaining CFAR operation, the MTI processor of the invention as illustrated in FIG. 2 comprises a second or blanking channel providing a second detection threshold which the primary channel video must also exceed in order to output a target signal. This second channel includes a pulse compressor 23 and detector 25, which may be similar in circuitry and function to the corresponding elements in the primary channel, and an attenuator 27 the function of which is to compensate for the attenuation introduced into the primary channel by the MTI circuitry 15, to thus establish the particular interrelationship of signal levels in the two channels hereinafter described.

The operation of the processor of FIG. 2 may best be understood by reference to FIG. 3, which illustrates the frequency response of the primary (MTI) and blanking channels. As shown, the MTI response displays the usual zero-doppler frequency notch effective to sharply attenuate low doppler clutter returns, while the blanking channel response is essentially flat through the frequency range of interest. Since the blanking channel signal input to comparator 21 defines a threshold with must be exceeded by the MTI channel signal in order that a target be indicated, and since as shown in FIG. 3 the blanking channel signal level exceeds the MTI channel level across the frequency band of the MTI notch, the blanking channel signal operates to block any target signal output through this frequency band. Further, since any high level clutter signal content which is present in the blanking channel at any given time will be effective transiently to raise the threshold which it defines, the correspondingly high level signal content of the MTI channel still will not exceed the threshold as thus raised.

This avoids the false alarms which otherwise might result from the presence of such high level clutter signal content in the primary channel, which would exceed the fixed threshold at 19 and so would yield a target signal output in the absence of a blanking channel threshold. In other words, valid targets are declared by the system of FIG. 2 only when the processed primary channel signal exceeds both its fixed detection threshold and the blanking channel output simultaneously, i.e., at the same range cell, and since the blanking channel output varies directly with clutter level any signals of magnitude representing large clutter scatterers are prevented by this blanking channel threshold from being indicated as a target.

To further explain the operation of the MTI processor of FIG. 2, it may be helpful to analyze its operation in terms of the MTI channel gain factor ($\alpha$) applied to low doppler clutter returns by the low frequency notch of the MTI, as compared against the blanking channel gain factor ($\beta$) introduced by the attenuator 27 in the blanking channel, the gain factors $\alpha$ and $\beta$ being both less than unity and measured as indicated in FIG. 2. In a typical processor in accordance with the invention the MTI channel gain at the MTI notch center frequency may be of the order of −50dB and the blanking channel gain $\beta$ about twice that, i.e., about −47dB.

If the clutter power at the MTI input is $P_c$, the notch introduced by the MTI at zero doppler will reduce the clutter power in the MTI output to $\alpha P_c$. Away from this zero doppler or notch frequency, at the higher doppler frequencies which represent targets of interest, the MTI is assumed to have essentially unity response so that a signal of power $P_s$ at the MTI input has approximately the same power as at its output. This assumption is not strictly correct, but in practical systems the MTI response sufficiently approximates unity that the assumption may be taken as valid for present purposes.

The blanking channel has a substantially flat frequency response at a level corresponding to the gain factor, $\beta$, introduced by attenuator 27. Thus, signal will an average power $P_s$ at the attenuator input and clutter with an average power $P_c$ at the attenuator's input exit at the power levels $\beta P_s$ and $\beta P_c$ respectively. $P_n$ indicates the thermal noise power at the channel outputs. Its value is reduced, relative to the signal and clutter power, to reflect the integration gain via pulse compression undergone by the signal and clutter.

In order to achieve the desired CFAR operation it is necessary that the blanking channel gain factor, $\beta$, always be greater than the MTI channel gain factor, $\alpha$, at MTI notch frequencies; that is:

$$\beta > \alpha \tag{1}$$

As indicated in the foregoing, targets are declared only when $$P_n + P_s + \alpha P_c > T \tag{2}$$

where T is the MTI channel fixed threshold, and $$P_n + P_s + \alpha P_c > \beta (P_n + P_s + P_c) \tag{3}$$

Inequalities (1), (2) and (3) will now be examined in three different situations; first, when only clutter is present; second, when in-the-clear signal is present; and third, when signal and strong clutter are present simultaneously.

Case 1 — Clutter Only

In this case the inequalities (2) and (3) which must be satisfied if a target is to be declared reduce to $$P_n + \alpha P_c > T \tag{4}$$

and $$P_n + \alpha P_c > \beta (P_n + P_c) \tag{5}$$

With a well designed MTI, inequality (4) will be satisfied only by very large clutter returns. But in such cases, the inequality $\beta > \alpha$ insures, with a very high probability, that inequality (5) will not be satisfied. Thus, so long as the clutter is suppressed more by the MTI than by the blanking channel attenuator, it will not be falsely detected. And the CFAR operation is independent of the clutter lever (at least for high clutter-to-noise ratio situations).

Case 2 — Signal In-The-Clear

In this situation, inequalities (2) and (3) reduce to $$P_n + P_s > T \qquad (6)$$

and $$P_n + P_s > \beta(P_n + P_s) \qquad (7)$$

Now so long as $$\alpha < \beta << 1 \qquad (8)$$

inequality (7) will always be satisfied and the detection criterion reduces to the classical one of signal-plus-noise exceeding a fixed threshold. Thus, the proposed technique does not degrade the detectability of targets in the clear.

Case 3 — Signal Immersed in Clutter

In strong clutter situations ($P_c >> P_s, P_c >> P_n$) the detection criteria become $$P_n + P_s + \alpha P_c > T \qquad (9)$$

and $$P_n + P_s + \alpha P_c > \beta P_c \qquad (10)$$

Assuming that the MTI attenuation is sufficient to provide a high processed signal-to-clutter ratio (i.e. $P_s > \alpha P_c$) and that the signal return is strong enough to exceed the threshold T with a sufficiently high probability (i.e., $P_n + P_s > T$), detection criteria (9) and (10) then become simply $$P_n + P_s > \beta P_c \qquad (11)$$

Thus, as a consequence of adding the blanking channel to the conventional processor, the signal-to-clutter ratio improvement capability of the system has been reduced from $\alpha^{-1}$ to $\beta^{-1}$, i.e., a reduction of about one-half where $\alpha$ and $\beta$ have the approximate 1:2 relationship mentioned above as typical. This small sacrifice in subclutter visibility enables the assurance of CFAR operation, however, and accordingly represents a very desirable trade-off particularly in automatic detection and reaction systems in which the need for CFAR is critical.

With reference now to FIG. 4, an alternative embodiment of the invention is shown requiring only a single pulse compression network for both the primary and blanking channels, this being significantly advantageous because conventional pulse compression networks are relatively complex and because difficulty sometimes is experienced in precisely matching two such networks as is desirable where the two channels are separate as illustrated in FIG. 2. Use of a single pulse compressor in both channels is made possible by time-sharing the pulse compression network between the two channels and use of an "integrate-and-dump" type MTI processor which may itself be of known type.

In FIG. 4, the "integrate-and-dump" MTI 31 comprises a recirculation loop including a delay element 33 which introduces a time delay equal to one pulse repetition period (PRP), and a summer 35 in which the recirculated signal is algebraically summed with the input signal in a multiplier 37 to which amplitude and phase weighting signals, designated "complex weights" in FIG. 4, are introduced on a pulse-to-pulse basis. In conventional integrate-and-dump MTI systems, these complex weights normally are generated on a look-to-look or beam direction basis in the beam direction control system, and applied to the radar IF signal after first converting it to digital in-phase and quadrature form. The weights are introduced by complex weight multipliers which conveniently may take the form of a digital multiplier quad, and the necessary delay and recirculation loop components of the MTI may likewise be digitally implemented.

After the MTI has thus individually weighted a series of pulses, say N pulses, and completed their integration by recirculation and addition, the integration product is gated out through a gate element 39 responsive to suitable control means (not shown) and the recirculation loop then is "dumped" or emptied preparatory to the start of the next such integration cycle. The advantage of such known integrate-and-dump MIT operation is that it enables selective weighting of successive returns as a function of beam look angle, to thus enable compensation for fixed clutter pattern variations and other radar response anomalies dependent on azimuthal angle.

In the system of FIG. 4 this integrate-and-dump MTI affords the further advantage that it provides an output into the processor chain, through gate 39, only during one interpulse period, the Nth interpulse period. Accordingly, during the next earlier or N-1st interpulse period, gate 39 may be switched to pass the receiver IF signal directly, with attenuation as at 41 for purposes of blanking channel level control as previously explained. This attenuated but otherwise unprocessed signal becomes the blanking channel signal and when passed by gate 39 during the N-1st interpulse period is processed through the pulse compressor 43 and detector 45, and compared to the detection threshold introduced through comparator 47. If above this threshold, the signal is stored in a memory for one interpulse period, which as indicated in FIG. 4 may be accomplished most simply by passing the signal through a one-PRP delay line 49, which thus shifts this signal into the Nth pulst interpulse period.

The MTI output is gated at 39 through the pulse compressor 43 during this Nth interpulse period; it is then detected, compared to the detection threshold at 47, and, if larger, compared to the delayed blanking channel output in comparator 51. A target is declared only if the primary channel output is the larger in both comparisons, just as in the case of the embodiment of FIG. 2.

As previously mentioned, the processor of this invention can be made to achieve CFAR operation at the cost of only a small degree of subclutter visibility so long as the MTI suppresses the clutter returns by more than the attenuation in the blanking channel, provided of course that the clutter signal frequencies fall within the MTI response notch. While this usually is the case it is possible that certain forms of chaff and other relatively rapidly moving clutter may include high frequency components outside the notch. Difficulties may also be experienced in situations in which the clutter level is so high that it drives either the radar receiver or the MTI circuit, or both, into saturation, as may result from spreading of the clutter spectrum by nonlinear devices in the receiver or MTI chain. To avoid these difficulties it may be desirable to include, in addition to the usual reciever AGC circuitry, means for enhancing the linearity of the processor chain including the MTI to better assure linearity even in the presence of very high level signals.

An alternative embodiment of the invention affording such linearity is shown in FIG. 5, in which an AGC circuit 61 is responsive to the radar IF signal level to apply gain adjustments, through gain control circuits 63 and 65, respectively, both prior to and following the MTI circuit 67. The gain adjustment applied following the MTI is the inverse, i.e., is equal in magnitude and opposite in direction, to that applied before the MTI; hence the two adjustments are complementary and their only effect is to attenuate otherwise troublesome signals within the MTI. The remainder of the MTI and blanking channel circuitry is the same as described in reference to FIG. 2, and functions in essentially the same manner.

As will be obvious to those skilled in the art, the relative gains $\beta$ of the blanking channel and $\alpha$ of the MTI channel could equivalently be maintained, if preferred, by omitting the blanking channel attenuator and adding an operational amplifier to the MTI channel to restore the same interrelationship of levels of the MTI and blocking channel signals as hereinbefore described. As will also be understood, the threshold signal input to the first threshold comparator may either be fixed relative to the noise level or variable with a derived and running estimate of background level, or both such thesholds could be provided with these and the blanking signal threshold arranged in any preferred sequence.

If desired, other features may be added to MTI processors in accordance with the invention. Post-detection processing, for example, employing diversity combining to achieve signal-to-clutter ratio improvements beyond that provided by the MTI alone, may be advantageous for some applications of systems in accordance with the invention, and if preferred such post-detection processor may be time shared between the primary and blanking channels in a manner similar to that described for the pulse compressor in FIG. 4.

In summary, the invention as described in the foregoing presents a simple, effective solution to an important and frequently encountered problem — the detection of targets in clutter, particularly strong ground clutter, while maintaining a low and constant false alarm rate.

What is claimed as new and desired to be secured by Letters Patent of the United States is:

1. For use with a pulse doppler radar, a received signal processor affording MTI operation and CFAR capability comprising:
   a. MTI cancellation circuit means having said received signals applied thereto and providing an MTI signal of level in accordance with a first predetermined gain factor ($\alpha$) at the MTI cancellation frequency and of substantially higher level at frequencies displaced therefrom;
   b. blanking circuit means having said received signals applied thereto and providing a blanking signal of level in accordance with a second predetermined gain factor ($\beta$) which is substantially uniform with frequency, the magnitude of $\beta$ being significantly greater than that of $\alpha$;
   c. pulse compression means and video detection means having applied thereto said MTI and blanking signals, and providing MTI video and blanking video signals by compression and detection of signals from said cancellation circuit and said blanking circuit means respectively;
   d. first threshold means connected to receive at least the MTI video signal from said detection means and operative to pass only such thereof as exceeds a first threshold; and
   e. second threshold means connected to receive said MTI video signal and operative to pass only such thereof as exceeds said blanking video signal as a second threshold, whereby false alarms which might otherwise result from high clutter levels in said MTI video signal are prevented by the correspondingly high levels of said blanking video signal applied as said second threshold.

2. A radar MTI processor as defined in claim 1 wherein said MTI cancellation circuit means comprises signal weighting means and signal recirculation loop in which a plurality of successive received signals are individually weighted and subsequently integrated to produce said MTI signal, and further including:
   a. gate means for alternately passing said MTI signal and said blanking signal to said pulse compression and video detection means with the blanking signal being passed during periods of integration of the MTI signal; and
   b. means for delaying said blanking video signal as applied to said second threshold so as to place it in time juxtaposition with said MTI video signal as received at said second threshold.

3. A radar MTI processor as defined in claim 1 further including automatic gain control means operative to apply complementary gain adjustments to the input and output of said MTI cancellation circuit to attenuate otherwise troublesome signals therein.

* * * * *